(12) United States Patent
Lamberson et al.

(10) Patent No.: US 8,850,851 B2
(45) Date of Patent: Oct. 7, 2014

(54) MAKING XENOTIME CERAMICS BY REACTIVE CERAMMING

(75) Inventors: Lisa Ann Lamberson, Painted Post, NY (US); Robert Michael Morena, Lindley, NY (US)

(73) Assignee: Corning Incorporated, Corning, NY (US)

( * ) Notice: Subject to any disclaimer, the term of this patent is extended or adjusted under 35 U.S.C. 154(b) by 267 days.

(21) Appl. No.: 13/581,021

(22) PCT Filed: Feb. 25, 2011

(86) PCT No.: PCT/US2011/026172
§ 371 (c)(1),
(2), (4) Date: Aug. 24, 2012

(87) PCT Pub. No.: WO2011/106597
PCT Pub. Date: Sep. 1, 2011

(65) Prior Publication Data
US 2012/0324954 A1     Dec. 27, 2012

Related U.S. Application Data

(60) Provisional application No. 61/308,080, filed on Feb. 25, 2010.

(51) Int. Cl.
*C04B 35/447* (2006.01)
*C04B 35/626* (2006.01)
*C03C 14/00* (2006.01)
*C03C 3/16* (2006.01)
*C03B 17/06* (2006.01)

(52) U.S. Cl.
CPC ........... *C04B 35/447* (2013.01); *C04B 2235/95* (2013.01); *C04B 35/6262* (2013.01); *C04B 2235/36* (2013.01); *C04B 2235/77* (2013.01); *C04B 2235/656* (2013.01); *C03C 14/004* (2013.01); *C04B 2235/81* (2013.01); *C03C 3/16* (2013.01); *C04B 35/62685* (2013.01); *C04B 2235/6021* (2013.01); *C03B 17/064* (2013.01); *C04B 2235/96* (2013.01); *C04B 2235/3225* (2013.01); *C04B 2235/5436* (2013.01)
USPC ............................................................ 65/53

(58) Field of Classification Search
CPC ............................ C04B 35/447; C04B 35/505
See application file for complete search history.

(56) References Cited

U.S. PATENT DOCUMENTS

| | | | |
|---|---|---|---|
| 5,094,677 A | 3/1992 | Morena | 65/18.1 |
| 6,423,415 B1 | 7/2002 | Greene | 428/432 |
| 6,770,111 B2 | 8/2004 | Morena | 55/523 |
| 7,300,896 B2 | 11/2007 | Zachau et al. | 501/9 |
| 8,067,326 B2 | 11/2011 | Godard et al. | 501/152 |

(Continued)

FOREIGN PATENT DOCUMENTS

WO    WO 2006/073841    *   7/2006

*Primary Examiner* — Joseph S Del Sole
*Assistant Examiner* — Russell Kemmerle, III
(74) *Attorney, Agent, or Firm* — Ryan T. Hardee (57) ABSTRACT

A reactive-ceramming process for making $YPO_4$ ceramics involving the reaction between a YP-glass and a Y-source material. The invention can be used to synthesize, inter alia, phase-pure $YPO_4$ ceramic material 5 at a relatively low temperature in a relatively short period of time and at a low cost. Invention can be used to make large piece of $YPO_4$ blocks suitable for, e.g., an isopipe in a fusion down-draw process for making large-size glass sheets.

15 Claims, 7 Drawing Sheets

(56) References Cited

U.S. PATENT DOCUMENTS

| | | | |
|---|---|---|---|
| 8,383,537 B2 | 2/2013 | Godard et al. | 501/152 |
| 8,425,871 B2 | 4/2013 | Gray et al. | 423/263 |
| 2009/0023574 A1 | 1/2009 | Holand et al. | 501/48 |
| 2009/0131241 A1* | 5/2009 | Godard et al. | 501/106 |
| 2009/0211299 A1 | 8/2009 | Tanner | 65/374.13 |
| 2012/0125048 A1* | 5/2012 | Godard et al. | 65/45 |
| 2013/0224465 A1* | 8/2013 | Langensiepen et al. | 428/220 |
| 2014/0011662 A1 | 1/2014 | Gray et al. | 501/152 |

\* cited by examiner

FIG. 8

MAKING XENOTIME CERAMICS BY REACTIVE CERAMMING

This application claims the benefit of priority to U.S. Patent Application No. 61/308,080 filed on Feb. 25, 2010.

TECHNICAL FIELD

The present invention relates in general to ceramic materials and method of making the same. In particular, the present invention relates to xenotime-type ceramic materials and a method for making the same by using reactive ceramming. The present invention is useful, e.g., in making large bulk xenotime-type material suitable for use in the refractory part of a molten glass handling system, such as an isopipe for a fusion down-draw process operating at a high temperature.

BACKGROUND

Refractory ceramic materials such as zirconia, alumina, zircon, and the like, have been used in making components of systems for making and handling high-temperature liquid, such a molten metals and glass materials. Desirably, these materials have good mechanical performance and performance stability under the high operating temperature, resistance to oxidation, and resistance to corrosion by the fluid.

For example, zircon has been used in making molten glass handling equipment in manufacturing systems of high-precision glass articles, such as glass sheets for liquid crystal display (LCD) substrates. A leading method for making high-precision glass sheets such as those for LCD substrate is the fusion down-draw process developed by Corning Incorporated, NY, U.S.A. This process involves the use of a bulk refractory forming block called isopipe. The dimensional stability of the isopipe is desirably high so that consistent glass sheets can be produced in an acceptable production cycle of the glass making system. One of the parameters indicating the dimensional stability of the isopipe is the creep rate of the material at the high operating temperature of the forming process under the load of gravity of the molten glass and the block itself Zircon was found to have acceptable creep rate for making relatively short isopipes for making glass sheets having a width of, e.g., about 2000 mm.

However, to make ever larger glass sheets precisely and consistently, materials having even lower creep rate than zircon are desired. One of the materials proposed for making isopipes in place of zircon is xenotime ($YPO_4$) ceramics. Phase-pure $YPO_4$ ceramic has a very high melting point (1990° C.) and a low creep rate at the normal operating temperature of an isopipe.

However, making bulk $YPO_4$ ceramic blocks having acceptable properties is not an easy undertaking. A simple, cost-effective method is highly desired.

The present invention satisfies this and other needs.

SUMMARY

Several aspects of the present invention are disclosed herein. It is to be understood that these aspects may or may not overlap with one another. Thus, part of one aspect may fall within the scope of another aspect, and vice versa.

Each aspect is illustrated by a number of embodiments, which, in turn, can include one or more specific embodiments. It is to be understood that the embodiments may or may not overlap with each other. Thus, part of one embodiment, or specific embodiments thereof, may or may not fall within the ambit of another embodiment, or specific embodiments thereof, and vice versa.

Thus, a first aspect of the present disclosure is a process for making a substantially crystalline material having a chemical composition consisting essentially of $Y_2O_3.(P_2O_5)_x$, where x is the molar ratio of $P_2O_5$ to $Y_2O_3$ in the composition of the crystalline material, and $0.30 \leq x \leq 1.20$, in certain embodiments $0.50 \leq x \leq 1.20$, in certain embodiments $0.60 \leq x \leq 1.20$, in certain embodiments $0.70 \leq x \leq 1.20$, in certain other embodiments $0.80 \leq x \leq 1.10$, in certain embodiments $0.90 \leq x \leq 1.10$, in certain embodiments $0.95 \leq x \leq 1.05$, comprising the following steps:

(I) providing a YP-glass having a composition consisting essentially of $Y_2O_3.(P_2O_5)_y$, and a softening temperature of Tsoft, where y is the molar ratio of $P_2O_5$ to $Y_2O_3$ in the YP-glass, and $1.6 \leq y \leq 9.0$, in certain embodiments $2.0 \leq y \leq 8.0$, in certain embodiments $3.0 \leq y \leq 6.5$, in certain other embodiments $4.0 \leq y \leq 6.5$;

(II) providing a Y-source material;

(III) obtaining a mixture upon melting having a molar ratio of $P_2O_5$ to $Y_2O_3$ equal to x and comprising a plurality of particles of the YP-glass and a plurality of particles of the Y-source material; and (IV) heating the mixture resulting from step (III) to a temperature T1 higher than Tsoft, whereby a first ceramic is obtained.

In certain embodiments of the first aspect of the present disclosure, the substantially crystalline material has a substantially homogeneous chemical composition.

In certain embodiments of the first aspect of the present disclosure, in step (III), the mixture is obtained in such a way that $0.95 \leq x \leq 1.00$, in certain embodiments $0.98 \leq x \leq 1.00$.

In certain embodiments of the first aspect of the present disclosure, in step (III), the mixture is obtained in such a way that $1.00 \leq x \leq 1.05$, in certain embodiments $1.00 \leq x \leq 1.03$.

In certain embodiments of the first aspect of the present disclosure, T1 is at least 1000° C., in certain embodiments at least 1200° C., in certain embodiments at least 1500° C., in certain embodiments at least 1700° C., in certain other embodiments at least 1800° C.

In certain embodiments of the first aspect of the present disclosure, the process further comprises the following steps:

(V) forming a plurality of particles of the first ceramic obtained from step (IV);

(VI) forming a compressed green-body from the particles of the first ceramic; and (VII) heating the compressed green-body to a temperature T2 higher than 1400° C. to obtain a dense bulk ceramic material, in certain embodiments higher than 1500° C., in certain embodiments higher than 1600° C., in certain other embodiments higher than 1700° C., in certain other embodiments higher than 1800° C., in certain other embodiments higher than 1900° C.

In certain embodiments of the first aspect of the present disclosure, step (I) comprises any one of (I1), (I2) and (I3):

(I1) forming a molten glass from $Y_2O_3$ powder and $P_2O_5$ powder;

(I2) forming a molten glass from $Y_2O_3$ powder and $H_3PO_4$ liquid; and (I3) forming a molten glass from a $Y_2O_3$-source material and a $P_2O_5$-source material.

In certain embodiments of the first aspect of the present disclosure, the substantially crystalline material consists essentially of phase-pure $YPO_4$.

In certain embodiments of the first aspect of the present disclosure, in step (III), the particle size distribution of the particles of the YP-glass has a median particle size from 5 μm to 30 μm, in certain embodiments from 5 μm to 25 μm, in certain embodiments from 10 μm to 20 μm, in certain embodiments from 10 μm to 15 μm.

In certain embodiments of the first aspect of the present disclosure, in step (III), the particle size distribution of the particles of the Y-source material has a median particle size from 5 μm to 30 μm, in certain embodiments from 5 μm to 25 μm, in certain embodiments from 10 μm to 20 μm, in certain embodiments from 10 μm to 15 μm.

In certain embodiments of the first aspect of the present disclosure, in step (III), the mixture comprises, in addition to the particles of the YP-glass, at least one of the following:

(III-M-1) particles of $Y_2O_3$;

(III-M-2) particles of a second Y-source material having a composition represented by the formula having a composition consisting essentially of $Y_2O_3.(P_2O_5)_z$, where z is the molar ratio of $P_2O_5$ to $Y_2O_3$ in the YP-glass, and z<1, in certain embodiments z<0.8, in other embodiments z<0.5, in certain other embodiments z<0.3; and (III-M-3) particles of a third Y-source material that in step (IV) can be transferred into $Y_2O_3$.

In certain embodiments of the first aspect of the present disclosure, in step (V), the particle size distribution of the first ceramic has a median particle size from 5 μm to 30 μm, in certain embodiments from 5 μm to 25 μm, in certain embodiments from 10 μm to 20 μm, in certain embodiments from 10 μm to 15 μm.

In certain embodiments of the first aspect of the present disclosure, the substantially crystalline material obtained has a porosity lower than 8% by volume, in certain embodiments lower than 5%, in certain other embodiments lower than 3%, in certain other embodiments lower than 1%.

In certain embodiments of the first aspect of the present disclosure, at least 80%, in certain embodiments at least 85%, in certain embodiments at least 90%, in certain other embodiments at least 95%, of the pores, if any, in the substantially crystalline material are closed pores.

In certain embodiments of the first aspect of the present disclosure, the substantially crystalline material has a creep rate at 1250° C. and 1000 psi of at most $5.0 \times 10^{-7} K^{-1}$, in certain embodiments at most $4.0 \times 10^{-7} K^{-1}$, in certain other embodiments at most $3.0 \times 10^{-7} K^{-1}$, in certain embodiments at most $2.0 \times 10^{-7} K^{-1}$, in certain embodiments at most $1.0 \times 10^{-7} K^{-1}$.

A second aspect of the present disclosure relates to a substantially crystalline bulk material made by a method according to the first aspect and the various embodiments thereof.

A third aspect of the present disclosure is a refractory block for use in the melting, delivery, handling, conditioning and forming of a molten glass material comprising the substantially crystalline bulk material according to the second aspect and the various embodiments thereof.

In certain embodiments of the third aspect of the present disclosure, the refractory block comprises an isopipe for the fusion down-draw process for making a glass sheet.

In certain embodiments of the third aspect of the present disclosure, the refractory block and/or isopipe has a dimension of at least 2500 mm, in certain embodiments at least 3000 mm, in certain other embodiments at least 3500 mm.

A fourth aspect of the present disclosure is a process for making a glass sheet using a molten glass handling apparatus comprising a refractory block according to the third aspect and the various embodiments thereof.

In certain embodiments of the fourth aspect of the present disclosure, the refractory block comprises an isopipe having a dimension of at least 2500 mm, in certain embodiments at least 3000 mm, in certain other embodiments at least 3500 mm.

In certain embodiments of the fourth aspect of the present disclosure, the isopipe is subjected to an operating temperature of at least 1200° C., in certain embodiments at least 1300° C., in certain embodiments at least 1400° C., in certain other embodiments at least 1500° C., for a consecutive period of at least two weeks, in certain embodiments at least 1 month, in certain embodiments at least 3 months, in certain embodiments at least 6 months.

One or more embodiments of the various aspects of the present disclosure have one or more of the following advantages. First, substantially phase-pure $YPO_4$ ceramics can be obtained at a relatively low synthesis temperature in a relatively short period of time, making it possible to fabricate large $YPO_4$ ceramic blocks at a relatively low cost. Second, large blocks of essentially pure $YPO_4$ ceramics can be fabricated with a high density and low porosity, such that the ceramics is suitable for making large-size isopipes for making glass sheets in a fusion down-draw process. Third, an isopipe of $YPO_4$ ceramic can be made with exceedingly low creep rate at a high temperature, making it suitable for making glass sheets based on glass compositions having a high forming temperature of at least 1300° C.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION

Unless otherwise indicated, all numbers such as those expressing weight percents and mole percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, in describing and claiming the present invention, the use of the indefinite article "a" or "an" means "at least one," and should not be limited to "only one" unless explicitly indicated to the contrary. Thus, for example, reference to "a Y-source material" includes embodiments having two or more such Y-containing materials, unless the context clearly indicates otherwise.

As used herein, a "wt %" or "weight percent" or "percent by weight", and a "mol %," or "mole percent" or "percent by mole" of a component or a material, unless specifically stated to the contrary, is based on the total weight or moles of the composition or article in which the component is included.

A bulk material in the present disclosure is a continuous solid mass having a total volume of at least 200 cubic centimeters ($cm^3$) at room temperature. Thus a stack of powders or pellets each having a total volume less than 100 $cm^3$ is not considered as being a bulk material in the present disclosure.

In the present disclosure, the terms xenotime and $YPO_4$ are used interchangeably. A "xenotime-type" material is a material comprising $Y_2O_3$ and $P_2O_5$ with a molar ratio of $P_2O_5$ to $Y_2O_3$ of from 0.30 to 1.20. As used herein, the term YP-glass means a glass material comprising both yttrium and phosphate; and a P-rich YP-glass means a glass material having a molar ratio of P atoms to Y atoms of higher than 1.

Figure 1:
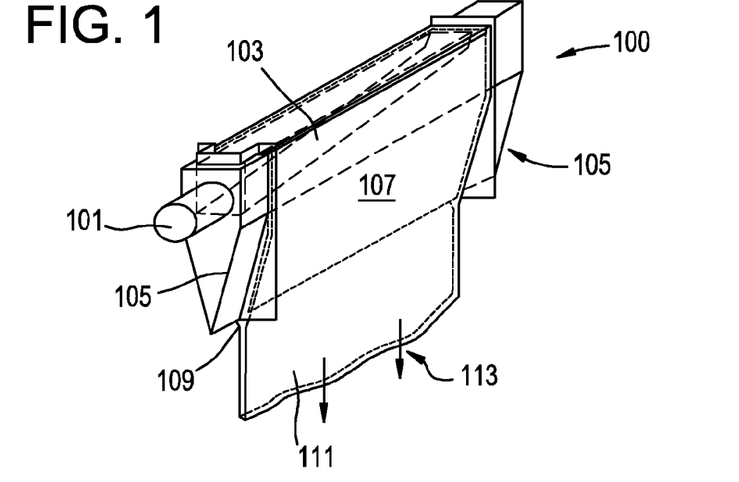
FIG. 1 is a schematic illustration of an isopipe operating to making a glass sheet by a fusion down-draw process.

FIG. 1 schematically illustrates an isopipe 100 in operation to make a glass ribbon 111 via a fusion down-draw process. The isopipe 100 comprises a unitary piece of zircon comprising a trough-shaped upper part 103 over a wedge-shaped lower part 105. Molten glass enters into trough 103 through an inlet tube 101, overflows both the top surfaces of the trough 103, forms two ribbons over the external side surfaces of the trough 103 and the two converging side surfaces of the wedge-shaped lower part 105, and fuse at the root 109, which is the lower tip of the wedge-shaped part, to form a single glass ribbon 111 which is drawn downward in the direction 113. The glass ribbon 111 is further cooled down downstream (not shown) to form a rigid glass sheet, which is further severed from the glass ribbon, cut to size and used for making LCDs. Because both external surfaces of the glass ribbon 111 were exposed only to ambient air and never came into contact with the surfaces of the isopipe, they are of pristine surface quality essentially free of scratches without the need of further surface finishing such as grinding and polishing. The glass sheets made by this process tend to have very high mechanical strength due to the lack of surface flaws. To make precision glass sheets having desired properties, such as high thickness uniformity, low stress, high stress uniformity, and the like, the stability of the shape of the isopipe 100 during the production cycle is very important. Unfortunately, the isopipe can sag overtime due to the gravity of itself and the load of molten glass, leading to shape and dimension shift. The larger the span of the isopipe, the more pronounced the sagging is, assuming a substantially constant creep rate of the material and a given operating temperature. The porosity of the zircon ceramic affects the sagging and other properties of the isopipe. Therefore, in general, the zircon ceramic for an isopipe is desirably densified to having a porosity of lower than about 10% by volume. Desirably, the pores in the zircon ceramic of an isopipe are mostly closed pores, i.e., they are not exposed to the ambient air surrounding the surface of the isopipe.

Zircon has been used in making the isopipes for the fusion down-draw processes. While the creep rate of zircon is acceptable for isopipes having a width suitable for making smaller generation glass sheets, as the glass sheet size grows larger and larger, it is highly desired that the creep rate can be further reduced to avoid creep failure or creep-induced product defect. Furthermore, the maximal operation temperature that zircon can tolerate over a long production campaign is limited. One potential material for very large isopipes or higher fusion delivery temperatures is xenotime ($YPO_4$ or $Y_2O_3.P_2O_5$). Pure $YPO_4$ has a melting point of approximately 1995° C. The present disclosure is concerned about, inter alia, novel method for making bulk $YPO_4$ ceramics, desirably having a high temperature creep rates of at most $5\times10^{-7}$/hr at 1250° C. and 1000 psi, more than a full order of magnitude lower than conventional zircon.

However, the processing of a highly refractory material such as xenotime into a large part such as an isopipe is not straight-forward. To start with, xenotime does not occur naturally (or in sufficient purity) to obtain it as a refined ore ready for pressing. Although at least one patent (U.S. Pat. No. 7,300,896 B2) could be found relating to xenotime glass-ceramics, in actuality the material obtained from the patent is not pure xenotime, but rather xenotime with fluxes and glass-forming oxides (such as $B_2O_3$ and $SiO_2$, etc.) since the melting temperatures needed to obtain a glass of the stoichiometric xenotime composition would exceed 2000° C. Such a glass-ceramic with the presence of these lower melting oxides would likely not have the refractoriness and creep resistance required for isopipe performance.

WO2007145847A2 & A3 and EP1838633A1 describe $YPO_4$ ceramic material and various processes for making them, the relevant contents of which are incorporated herein by reference in their entirety. The process as taught therein present a number of technical challenges with respect to obtaining a dense, low porosity xenotime body with minimum shrinkage.

The method of the present disclosure aims at providing a simpler and less expensive alternative synthesis route of $YPO_4$ ceramics. The method of the present disclosure will be generally referred to a "reactive ceramming" process including a reaction illustrated as follows:

Glass frit+Reactant(s)→Desired Ceramic, where the glass frit comprises a P-rich YP-glass, and the reactant(s), as a Y-source material, provides additional Y and optionally P for the final desired product, and a high temperature reaction between the glass frit and reaction(s) results in the desired ceramic having the desired composition, crystalline phases and assemblage thereof. The glass frit desirably has a relatively low melting temperature, which flows, wets the reactant(s) during the reactive ceramming step, effectively facilitating the formation of the desired ceramic at a relatively low temperature. The use of a frit in reactive-ceramming also permits glass flow to occur prior to the synthesis reaction, leading to densification and relatively low porosity.

Reactive-ceramming is distinguished from the glass-ceramic route, which can be written schematically as:

Precursor glass→Desired ceramic.

In a glass-ceramic route, to minimize the amount of residual glass in the final desired ceramic, the precursor glass must closely approximate the composition of the end product.

Thus, it is unlikely that the glass-ceramic process can be practically used to obtain phase pure quantities of very refractory compounds, since the temperatures required to melt the precursor glass would make the process very difficult.

Figure 2:
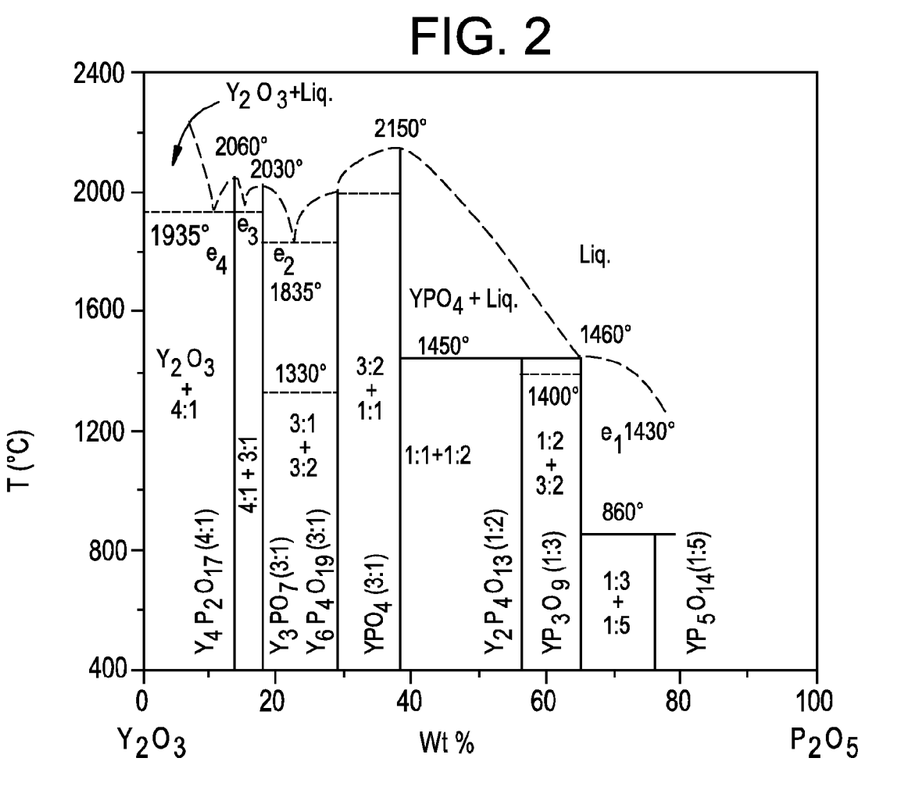
FIG. 2 is an equilibrium diagram of a $P_2O_5$—$Y_2O_3$ binary material system.

A binary equilibrium diagram is shown in FIG. 2 for the $Y_2O_3$-$P_2O_5$ system (in wt %). The high liquidus temperature (2150° C.) for $YPO_4$ essentially precludes synthesis by the glass-ceramic route.

The process of the present invention can be used to make any substantially crystalline material (hereinafter called "target material") having a substantially homogeneous chemical composition consisting essentially of $Y_2O_3.(P_2O_5)_x$, where x is the molar ratio of $P_2O_5$ to $Y_2O_3$ in the composition of the crystalline material, $0.30 \leq x \leq 1.20$, in certain embodiments $0.50 \leq x \leq 1.20$, in certain embodiments $0.60 \leq x \leq 1.20$, in certain embodiments $0.70 \leq x \leq 1.20$, in certain other embodiments $0.80 \leq x \leq 1.10$, and $0.90 \leq x \leq 1.10$. When x equals 1, the target material is stoichiometric xenotime and is believed to have the highest refractoriness. However, small excessive amount of either $P_2O_5$ or $Y_2O_3$ is acceptable to the extent $0.30 \leq x \leq 1.20$. In certain embodiments, for better high-temperature performance, especially creep rate at an operating temperature of at least 1200° C., it is desired that $0.90 \leq x \leq 1.10$, in certain embodiments $0.95 \leq x \leq 1.05$. For certain glass compositions and glass making processes the target material is desired to handle, the target material may be required to consistently perform for a long period of time at temperatures above 1200° C., in certain embodiments above 1250° C., in certain other embodiments above 1280° C., in certain other embodiments above 1300° C. For those high temperature applications, it is highly desired that the molar ratio of $P_2O_5$ to $Y_2O_3$ is close to the stoichiometric, e.g., $0.98 \leq x \leq 1.02$, in certain embodiments $0.99 \leq x \leq 1.02$. A high $P_2O_5$ molar ratio in the target material can lower the cost of the material, due to the relative scarcity and high cost of $Y_2O_3$ as a source material. However, too much excess of $P_2O_5$ in the target material can lower the refractoriness and creep rate of the ceramic. Therefore, for the reasons of both costs and the mechanical performance of the material, it is highly desired that the target material has a composition relatively close to the stoichiometric $YPO_4$.

By "substantially crystalline" is meant the material comprise, by volume, at least 90% of crystalline phases. Thus, the target material may comprise one or more crystalline phases. It is highly desired that the target material comprises at least 80%, in certain embodiments at least 85%, in certain other embodiments at least 90%, in certain other embodiments at least 95%, still in other embodiments at least 98%, still in other embodiments at least 99%, by volume, of the $YPO_4$ crystalline phase. By "consist essentially of" is meant that the material may comprise additional components at amounts that do not materially affect the properties of the material. Thus, the target material may comprise, in addition to $Y_2O_3$ and $P_2O_5$ at the specified molar ratio, other components such as $ZrO_2$, $TiO_2$, $Fe_2O_3$, CaO, MgO, and other metal oxides, at small amounts, to the extent the presence of those other oxides do not materially negatively affect the desired properties of the target material to be synthesized such as refractoriness and creep rate. However, other oxides may be unintentionally included into the final material as impurities in the batch materials, contaminants during the synthesis process, or intentionally as a sintering additive and other process and/or property modifier. In general, it is highly desired that the final target material is essentially free of alkaline metal oxides due to their ability to migrate into an alkaline-free glass melt if the target material is intended to handle an alkaline-free glass melt such as those for making LCD glass substrates. The presence of other oxides such as $Fe_2O_3$ and $TiO_2$ reduces the refractoriness and mechanical performance of the target material; however, in certain embodiments, addition of them at a small amount may be desirable to reduce the porosity in the target material and to achieve better and/or faster sintering. Nonetheless, the amount of each of the other oxides than $P_2O_5$ and $Y_2O_3$ in the target material is desired to be at most 3 mol %, in certain embodiments at most 2 mol %, in certain other embodiments at most 1 mol %, in certain other embodiments at most 0.5 mol %, in certain other embodiments at most 0.1 mol %.

The YP-glass provided in step (I) of the process of the present invention has a composition consisting essentially of $Y_2O_3.(P_2O_5)_y$, and a softening temperature of Tsoft, where y is the molar ratio of $P_2O_5$ to $Y_2O_3$ in the YP-glass, and $1.6 \leq y \leq 9.0$, in certain embodiments $2.0 \leq y \leq 8.0$, in certain embodiments $3.0 \leq y \leq 6.5$, in certain other embodiments $4.0 \leq y \leq 6.5$. The higher the molar ratio y, the lower the softening point (Tsoft) of the YP-glass. By "softening temperature" or "softening point" is meant the temperature at which a glass having a homogeneous composition has a viscosity of $10^{7.6}$. A relatively lower Tsoft would allow better wetting of the Y-source material in the reactive-ceramming step (IV), better mixing of the reactants, thus potentially lower porosity in the first ceramic and the final target material, lower reaction temperature and faster reaction speed. In general, when $y \geq 1.6$, the YP-glass can be melted at a low temperature and pour at a temperature at 1000° C. or even lower. However, if $y > 9.0$, the YP-glass tends to become hygroscopic in the ambient air, making it less desirable to handle.

The YP-glass can be made by reacting a $Y_2O_3$-source material with $P_2O_5$-source material. The $Y_2O_3$-source material can be advantageously $Y_2O_3$ powder, yttrium halides, $Y(OH)_3$, $Y(NO_3)_3$, $Y(NO_2)_3$, and the like; and the $P_2O_5$ source material can be $P_2O_5$ powder, $H_3PO_4$ liquid, and the like. It is highly desirable that both the $Y_2O_3$-source material and the $P_2O_5$-source material do not introduce metals other than Y at an amount higher than desired in the final composition. In an embodiment where the YP-glass is made from $P_2O_5$ and $Y_2O_3$, the powders of these two oxides can be weighed and mixed and then reacted to form the glass. In an embodiment where the YP-glass is made from $Y_2O_3$ powder and $H_3PO_4$, measured amount of $Y_2O_3$ can be poured into measured amount of $H_3PO_4$, followed by mixing, calcination to remove water, and then melting to form a substantially homogeneous glass material. Regardless of the method of making, it is desirable that the YP-glass is melted and has a substantially homogeneous composition, i.e., the distribution of $Y_2O_3$ and $P_2O_5$ is substantially even throughout the glass material. When $P_2O_5$ or $H_3PO_4$ is used as starting material for making the YP-glass material, consideration should be given to the volatility of $P_2O_5$ during heat treatment. Thus, the melting of the YP-glass should advantageously be carried out in a closed system. If knowledge of the precise composition of the YP-glass is needed, one may need to perform a composition analysis of the YP-glass at the end of step (I), so that precise and accurate batching for step (III) can be done for a predetermined target material. The melted glass can be cooled down and then ball-milled to make particles of the YP-glass having the desired particle size and size distribution for the following steps. Alternatively, hot YP-glass may be subjected to quenching by a cold fluid such as air jet or water stream to obtain particles directly therefrom.

The Y-source material provided in step (II) can be advantageously $Y_2O_3$ powder or powder of a material having composition consisting essentially of $Y_2O_3.(P_2O_5)_z$, where z is the molar ratio of $P_2O_5$ to $Y_2O_3$ in the YP-glass, and $z<1$, in certain embodiments z<0.8, in other embodiments z<0.5, in certain other embodiments z<0.3. Still alternatively, the Y-source material can be a powder of a Y-containing material that upon processing in step (IV) in an atmosphere containing oxygen can be converted into $Y_2O_3$. Such Y-source material can be, e.g., $Y(OH)_3$, yttrium halides, $Y(NO_3)_3$, $Y(NO_2)_3$, and the like. One or more types of Y-source material may be used. One having ordinary skill in the art can readily calculate the proper amount of the Y-source material required to produced the target material with a predetermined composition from a YP-glass with a given composition.

In step (III), a relatively uniform mixture of the YP-glass and the Y-source material is highly desired. To that end, it is desired that the YP-glass and the Y-source material are both in powder form. As discussed supra, once the compositions of the target material and the YP-glass are known, the required amount of the Y-source material with a given composition can be readily calculated.

While particle size and size distribution of the YP-glass and the Y-source materials in step (III) are not critical for the present invention, it is nonetheless desired that the particles are of relatively fine size in order to obtain an intimate mixture of these two types of materials. An intimate mixture can facilitate the wetting of the Y-source material by the YP-glass during step (IV), and thus the reaction between them, resulting in a homogeneous composition in the final target material and faster synthesis process. In an exemplary embodiment, in step (III), the particle size distribution of the YP-glass has a median particle size from 5 μm to 30 μm, in certain embodiments from 5 μm to 25 μm, in certain embodiments from 10 μm to 20 μm, in certain embodiments from 10 μm to 15 μm. In an exemplary embodiment, in step (III), the particle size distribution of the Y-source material has a median particle size from 5 μm to 30 μm, in certain embodiments from 5 μm to 25 μm, in certain embodiments from 10 μm to 20 μm, in certain embodiments from 10 μm to 18 μm.

In step (IV), the mixture of the YP-glass and the Y-source material obtained in step (III) is subjected to heat treatment where they react to form a first ceramic material, which can be used as the target material in certain embodiments. Desirably, the mixture is heated to a temperature T1 higher than the softening temperature of the YP-glass, so that the YP-glass flows, wets the Y-source material, and subsequently reacts with the Y-source material to obtain a ceramic having the composition of the target material. In certain embodiments, T1 is at least 1000° C., in certain other embodiments, T1 is at least 1200° C., in certain other embodiments, T1 is at least 1500° C., in certain other embodiments T1 is at least 1700° C., in certain other embodiments T1 is at least 1800° C.

In certain embodiments, step (IV) includes multiple steps starting at a relatively low temperature such as the room temperature. During the heating process, the mixture may be first heated to a temperature TA such as at around 200° C., where it is held to allow the evaporation of water and moisture, then a temperature TB higher than TA where certain components, if included, are converted; then a temperature TC higher than TB where the YP-glass melts, then a temperature TD where the reaction between the YP-glass and the Y-source material occurs, and finally, to the temperature T1 where the reaction is allowed to complete, the crystal grains to fuse with each other, and the desirable crystal sizes are obtained.

While the first ceramic obtained in step (IV) may be suitable for use as is in certain applications, it may be desirable to further process it to obtain a material having even better performance for use in, e.g., the isopipes of a fusion down-draw glass sheet making process. To obtain highly densified target ceramic material with very low porosity and low creep rate at temperatures as high as 1280° C., it is highly desirable to subject the first ceramic to the following additional steps:

(V) forming a plurality of particles of the first ceramic obtained from step (IV);

(VI) forming a compressed green-body from the particles of the first ceramic; and (VII) heating the compressed green-body to a temperature T2 higher than 1400° C. to obtain a dense bulk ceramic material, in certain embodiments higher than 1500° C., in certain embodiments higher than 1600° C., in certain other embodiments higher than 1700° C., in certain other embodiments higher than 1800° C., in certain other embodiments higher than 1900° C.

The particles can be obtained by ball-milling bulk first ceramic in step (V). The particle size and size distribution can have significant impact on the packing efficiency in step (V) when they are formed into the green-body. An exemplary particle distribution demonstrates a median particle size from 5 μm to 30 μm, in certain embodiments from 5 μm to 25 μm, in certain embodiments from 10 μm to 20 μm, in certain embodiments from 10 μm to 15 μm.

In one embodiment, in step (V), the particles of the first ceramic are placed into a hermetically sealable flexible bag, vibrated to obtain a compact packing, and then placed into a high-pressure isostatic press to obtain a highly compacted, dense green-body. The green-body is then sintered in step (VII) to obtain a highly densified target ceramic block. During step (VII), the crystal grains fuse with each other and shrink to form a dense body with very low porosity. In certain embodiments, thus obtained target material has a porosity lower than 8% by volume, in certain embodiments lower than 5%, in certain other embodiments lower than 3%, in certain other embodiments lower than 1%. In certain other embodiments, in the thus obtained target material at least 80%, in certain embodiments at least 85%, in certain embodiments at least 90%, in certain other embodiments at least 95%, of the pores, if any, are closed pores. Close pores are pores that are isolated from the atmosphere surrounding the surface of the target material.

The target ceramic material desirably exhibits a creep rate at 1250° C. and 1000 psi of at most $5.0 \times 10^{-7} K^{-1}$, in certain embodiments at most $4.0 \times 10^{-7} K^{-1}$, in certain other embodiments at most $3.0 \times 10^{-7} K^{-1}$, in certain embodiments at most $2.0 \times 10^{-7} K^{-1}$, in certain embodiments at most $1.0 \times 10^{-7} 1 K^{-1}$.

By using a sintering process including steps (V) to (VII) above, large-size, high-quality, dense blocks of the target ceramic material having a substantially homogeneous composition can be made, which otherwise would be difficult to achieve at the end of step (IV). Such large blocks have at least one dimension, in certain embodiments at least two dimensions perpendicular to each other, of at least 1 meter, in certain embodiments at least 2 meters, in certain other embodiments at least 2.5 meters, in certain other embodiments at least 3.0 meters, in size. Such large blocks of high-strength, highly-uniform target material can be used in many applications, for example, in making components in a glass making, delivery, conditioning and forming system, including but not limited to the isopipes of fusion down-draw processes for making large-size glass sheets for use as LCD glass substrates. For example, the target ceramic material may be used to make an isopipe having a length of at least 2500 mm, in certain embodiments at least 3000 mm, in certain other embodiments at least 3500 mm. The low creep rate at the normal operating temperature of an isopipe of the material is particularly useful and advantageous for a stable fusion down-draw process for making glass sheets of Gen10 or larger. The isopipe may be subjected to an operating temperature of at least 1200° C., in certain embodiments at least 1300° C., in certain embodiments at least 1400° C., in certain other embodiments at least 1500° C., for a consecutive period of at least two weeks, in certain embodiments at least 1 month, in certain embodiments at least 3 months, in certain embodiments at least 6 months.

The isopipe may be made by, e.g., machining a large piece of ceramic block resulting from step (VII) of an embodiment of the method of the present invention.

The following non-limiting examples further illustrate the present invention.

EXAMPLES

Two YP-glass compositions, YPG-1 and YPG-2 (see TABLE I, below) were melted in the 70-80 wt % $P_2O_5$ region, using reagent grade yttrium dioxide and phosphorus pentoxide as batch materials. The glasses selected were fluid when poured at 1600° C. after melting for 6 hrs in platinum crucibles. No melting problems such as excess foaming were encountered. The annealed glasses were clear and transparent with no evidence of undissolved batch or devitrification.

TABLE I

|  |  | YPG-1 | | YPG-2 | |
| --- | --- | --- | --- | --- | --- |
| Composition |  | $Y_2O_3$ | $P_2O_5$ | $Y_2O_3$ | $P_2O_5$ |
| Batched (%) | weight | 28.45 | 71.55 | 24.05 | 75.95 |
|  | mole | 20.0 | 80.0 | 16.6 | 83.4 |
| Analyzed (%) | weight | 34.6 | 65.4 | N/D | N/D |
|  | mole | 25.0 | 75.0 | N/D | N/D |

ND: Not Determined

Following melting, the glasses YPG-1 and YPG-2 were jet-milled to glass frits having a mean particle size of 10-15 μm, and sieved through 325M. Small quantity mixtures (50 g) of each of the above-milled frits were blended with $Y_2O_3$ to obtain mixtures with a 1:1 $Y_2O_3$:$P_2O_5$ ratio (molar basis) according to TABLE II.

TABLE II

| Weight ratios required to yield stoichiometric $YPO_4$ | | |
| --- | --- | --- |
|  | Blend-1 | Blend-2 |
| YPG-1 | 60.0 | — |
| YPG-2 | — | 50.8 |
| $Y_2O_3$ | 40.0 | 49.2 |

Figure 3:
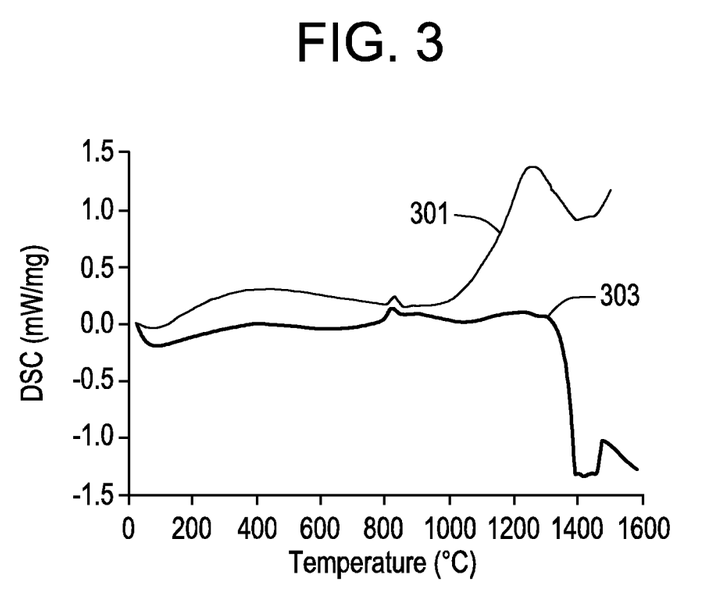
FIG. 3 is a differential scanning calorimetry (DSC) diagram of a YP-glass and a mixture of a YP-glass and $Y_2O_3$.

Reactions occurring during initial heating in the frit itself and in the associated reactive-ceramming blend are shown in FIG. 3 where DSC scans are presented of the YPG-1 frit and the corresponding Blend-1.

Both the YPG-1 frit and Blend-1 show a common exotherm at approximately 850°, characteristic of a crystallization event. A second, broader exotherm appears in the blend at approximately 1250° C. No second exotherm appears in the YPG-1 frit. A sharp endotherm, characteristic of melting, occurs at approximately 1400° for the frit, but is absent for the blend. The DSC scans for YPG-2 and its associated Blend-2 behave similar to the corresponding materials shown in FIG. 3.

Figure 4:
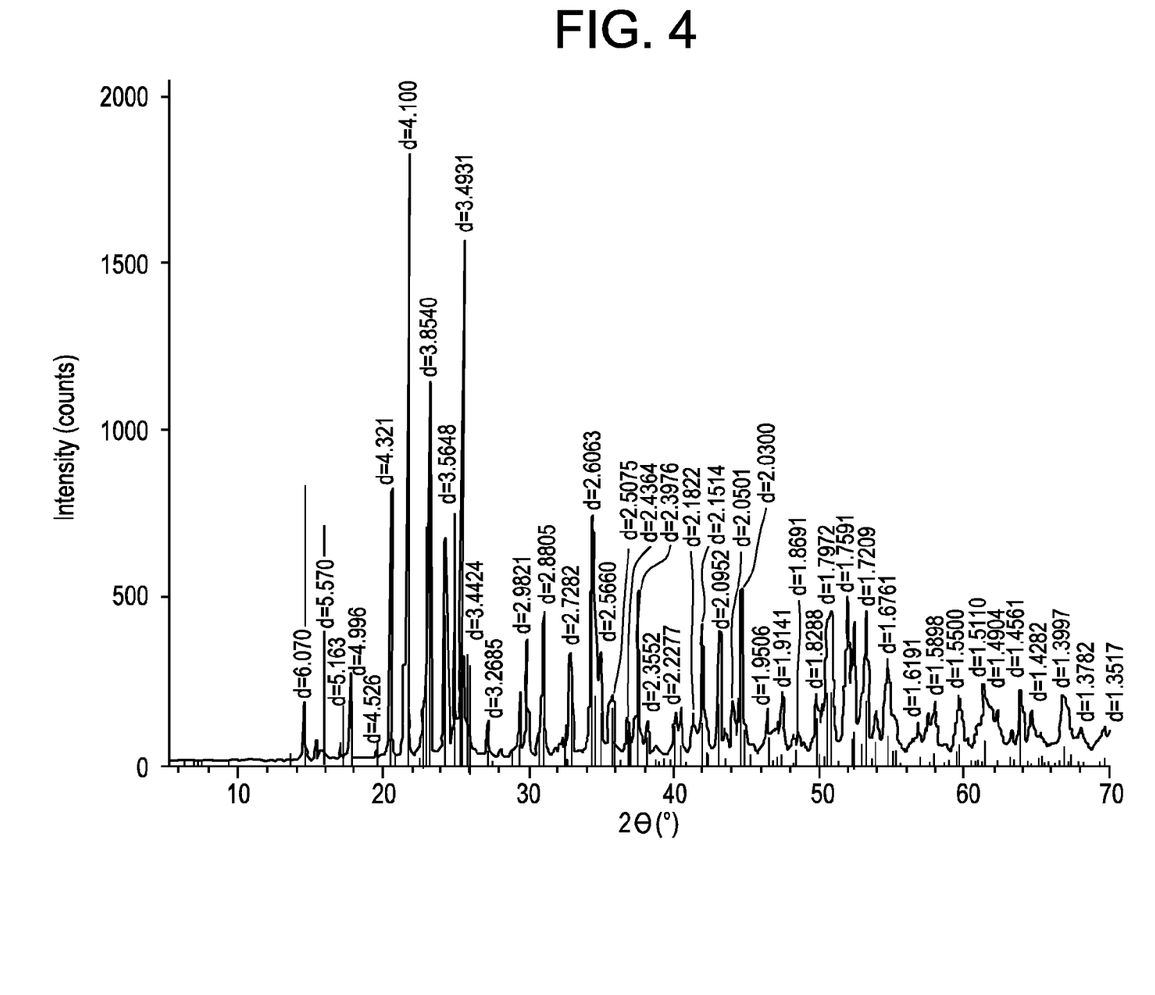
FIG. 4 is an XRD graph of a YP-glass after having been heated to 1000° C.
Figure 5:
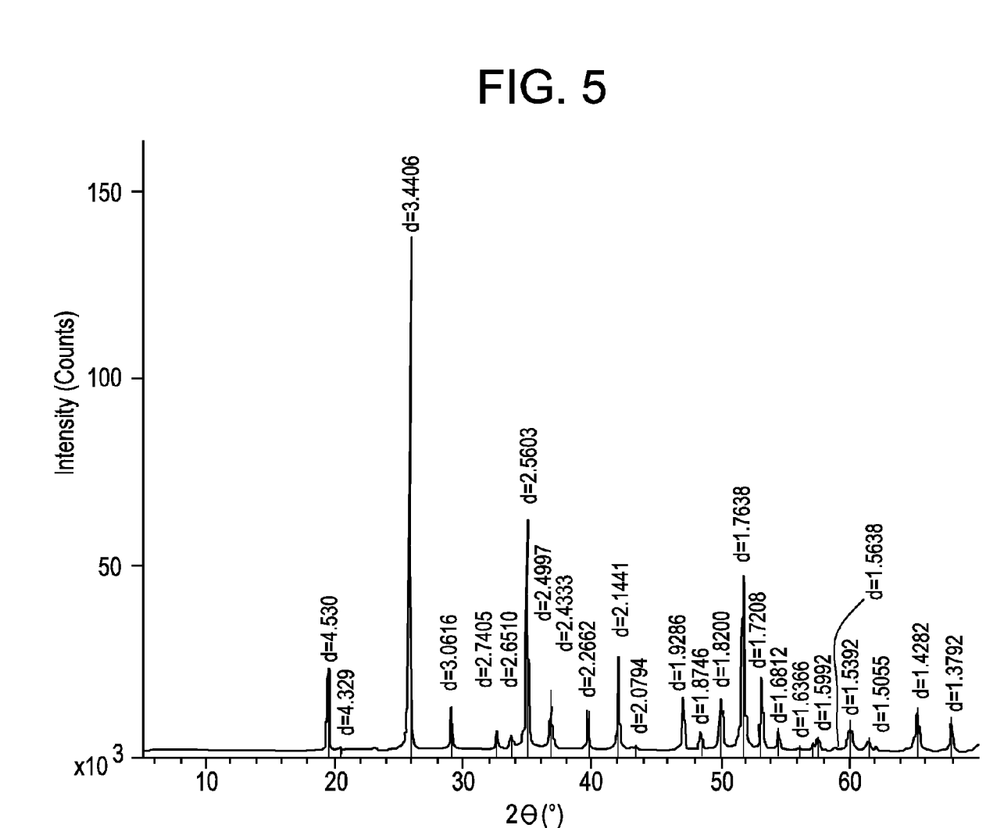
FIG. 5 is an XRD graph of the same mixture shown in FIG. 4 after having been fired to 1200° C., with an intermediate hold at 1000° C.
Figure 6:
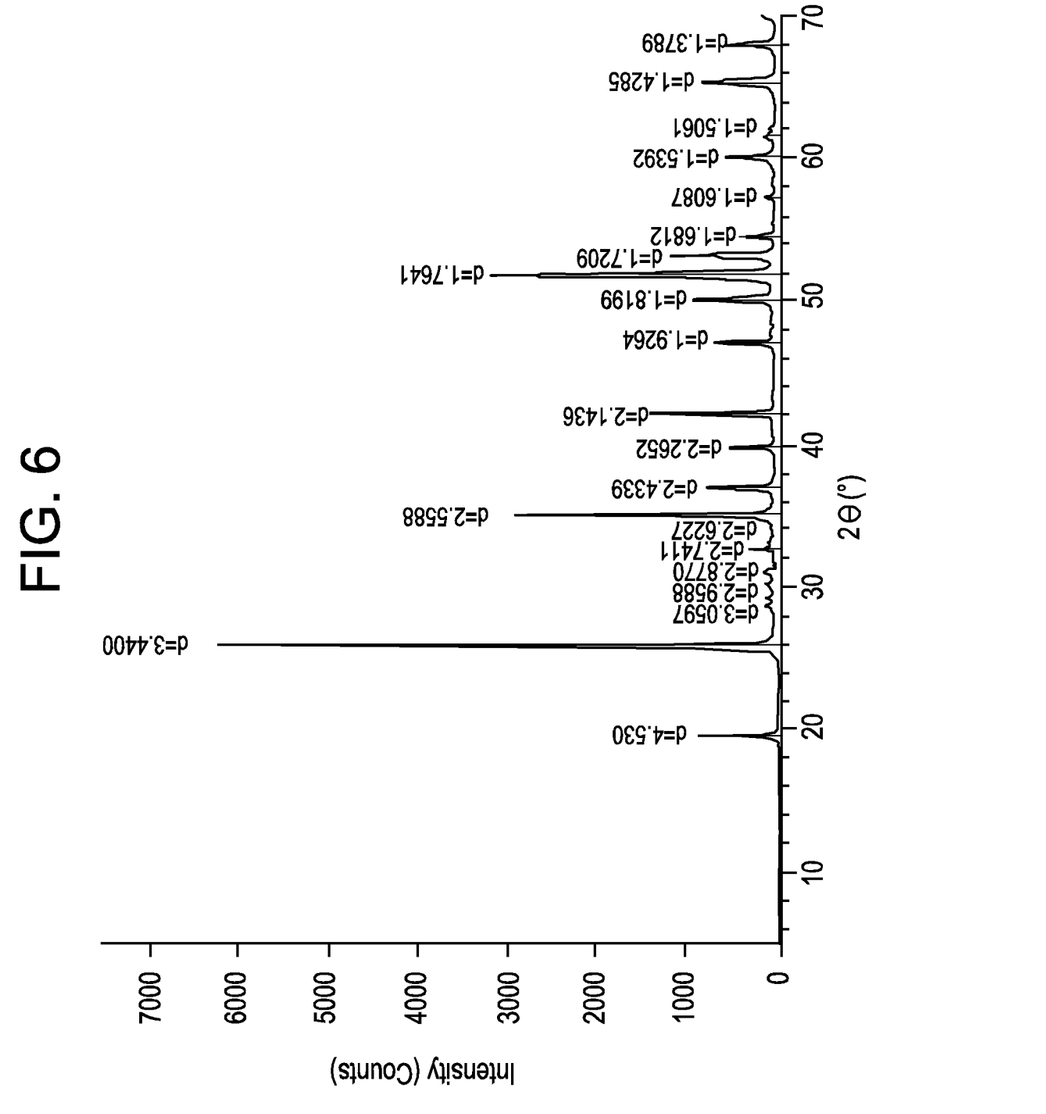
FIG. 6 is an XRD graph of the same mixture shown in FIGS. 4 and 5 after having been fired to 1580° C.

Identification of the various reactions giving rise to the exotherms in FIG. 3 is provided in FIGS. 4 to 6, which show room temperature XRD scans. FIG. 4 shows the XRD graph of YPG-1 frit after having been heated to 1000° C. The frit has crystallized after this thermal treatment, forming crystalline products $Y(PO_3)_3$, and $Y_2(P_4O_{13})$ as major phases, with a small amount of $YPO_4$. Note that the two major phases agree well with the phases, predicted from the phase diagram (FIG. 2). The correspondence of the identical 850° C. exotherm in FIG. 3 for both the straight frit (YPG-1) and Blend-1 strongly implies that this same reaction occurs in both the straight frit and the blend, suggesting that the YPG-1 frit crystallizes independently of the presence of the $Y_2O_3$ batch component to form the two phases predicted from the equilibria diagram.

FIG. 5 shows an XRD scan of Blend-1 after having been fired to 1200° C., with an intermediate hold at 1000° C. during the heat-up cycle to simulate the thermal history of the YPG-1 frit sample shown in FIG. 4. The initial crystalline phases, $Y(P_3O_9)$ and $Y_2(P_4O_{13})$, formed after the 850° exotherm have largely disappeared, with only trace levels of XRD peaks present for these phases. $YPO_4$ and a small amount of unreacted $Y_2O_3$ are the sole crystalline phases present. Note that $YPO_4$ formed from the "reactive-ceramming" reaction of the YPG-1 frit (or, most likely, from the subsequent devitrification phases) and yttria reactants, since in the absence of the $Y_2O_3$ reactant, the DSC scan shown in FIG. 3 of the YPG-1 frit itself only indicates a melting endotherm in this temperature range. The formation of $YPO_4$ corresponds, then, to the 1200° C. exotherm shown in FIG. 5 for Blend-1.

FIG. 6 is an XRD diagram of Blend-r after having been fired to 1580° C. This figure shows that after firing to 1580°, no unreacted $Y_2O_3$ appears in Blend-1. The major crystalline phase is $YPO_4$. There are several very minor peaks located near 30° 2θ that are unidentified, do not correspond to unreacted $Y_2O_3$, and belong to an unknown crystalline phase(s).

The amount of the unidentified phases(s) formed during the reactive-ceramming process may be controlled by blend composition (i.e., YP-glass reactant frit : $Y_2O_3$ ratio). Shown in TABLE III are blend information for 3 compositions, the stoichiometric Blend-1, and two compositions designed to be more yttria-enriched, Blend-4, and Blend-3.

TABLE III

| Blend Designation | Blend composition (wt ratio, YPG-1 frit: yttrium oxide) | Molar ratio in blend ($P_2O_5$:$Y_2O_3$) |
| --- | --- | --- |
| Blend-1 (stoichiometric) | 60:40 | 50:50 |
| Blend-3 (high yttria) | 45:55 | 40:60 |
| Blend-4 (mid-yttria) | 54:46 | 40:55 |

Figure 7:
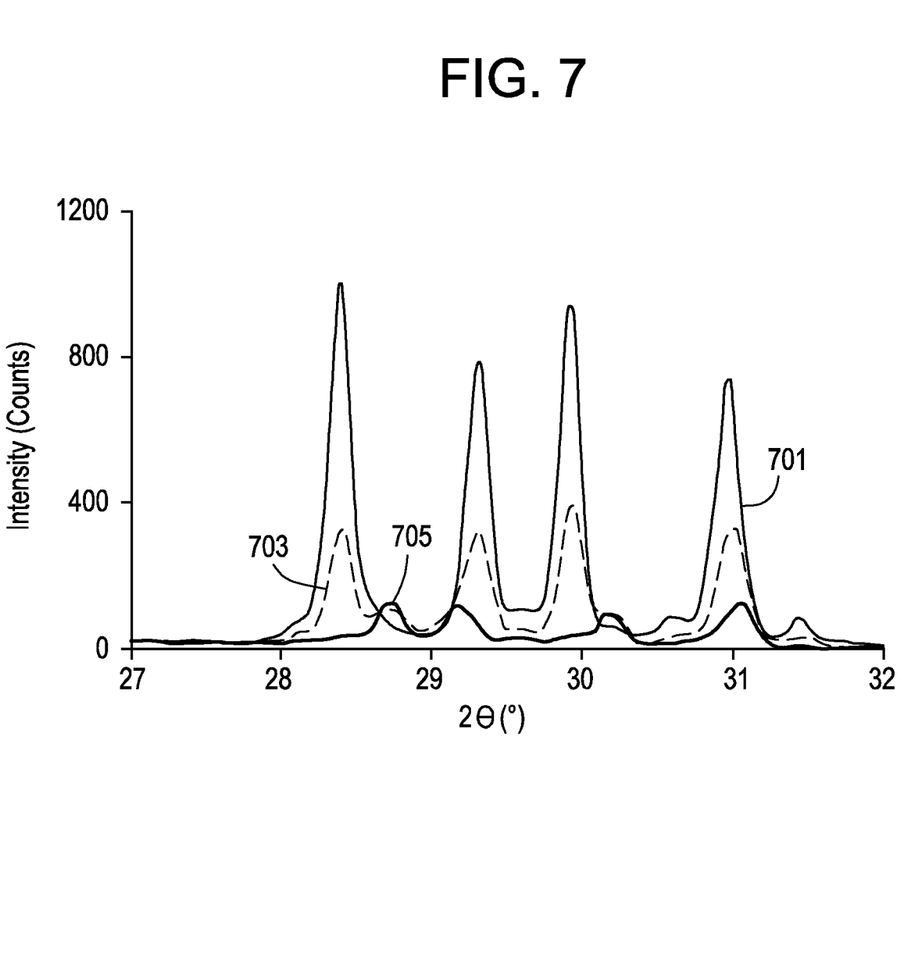
FIG. 7 show parts of the XRD graphs centered around 30° 2θ for the three different mixtures of a YP-glass and $Y_2O_3$ having different ratios of $Y_2O_3$ after having been fired to 1580° C.

Shown in FIG. 7 are portions of the XRD scan centered around 30° 2θ for the stoichiometric Blend-1 having a YPG-1:$Y_2O_3$ weight ratio of 60:40, as well as the two blends made at higher yttria content, Blend-3 having a YPG-1:$Y_2O_3$ weight ratio of 45:55, and Blend-4 having a YPG-1:$Y_2O_3$ weight ratio of 54:46. All samples were fired at 1200° C. for 6 hours and then 1580° C. for 6 hours. All three compositions used the same reaction frit, YPG-1, with a mean particle size of 15 μm. XRD on all three fired compositions showed phase-pure $YPO_4$ except for small, unidentified peaks near 20=30°. The amount of unidentified phases(s), however, as indicated by XRD peak height, varied with blend composition. The stoichiometric Blend-1 had peak heights for the unidentified phase(s) of approximately 100 counts, a very minor peak, similar to XRD results presented earlier for this same frit : yttria ratio (see FIG. 7). The mid yttria-rich blend (Blend-4, having a YPG-1 to yttria weight ratio of 54:46, had peak heights for the unidentified phase(s) of 300-400 counts, significantly higher than the stoichiometric blend. The high yttria-rich blend, Blend-3, having a YPG-1 to yttria weight ratio of 45:55, had peak heights for the unidentified phase(s) of approximately 800-1000 counts, significantly higher than either of the other blends. The scaling of peak height of the unidentified phase with yttria content indicates that this phase is yttria-rich with respect to stoichiometric $YPO_4$.

Larger batches of these three blends in quantities sufficient for iso-pressing were prepared by the following steps:
(a) melting the YPG-1 glass;
(b) ball-milling the YPG-1 glass melted in step (a), and sieving through a 325M screen;
(c) combining the ball-milled YPG-1 glass powder with $Y_2O_3$ powder, mixing in a turbula blender in the desired weight ratio to form the desired blend; followed by sieving through a 100M screen;
(d) mixing the blend with water, ethyl-cellulose and other extrusion aids, and extruding into spaghetti;
(e) firing the spaghetti to 1580° C. and maintaining this temperature for 8 hours to form the desired ceramic material;
(f) ball-milling the fired spaghetti to 10-15 μm, and then sieving through a 325M screen; and
(g) loading the ball-milled powder into an isostatic mold, pressing into shape, and firing to 1750° C. to sinter.

Two variants of each blend were made, one using a mean frit particle size of 5 μm, and the other a frit mean particle size of 15 μm.

Figure 8:
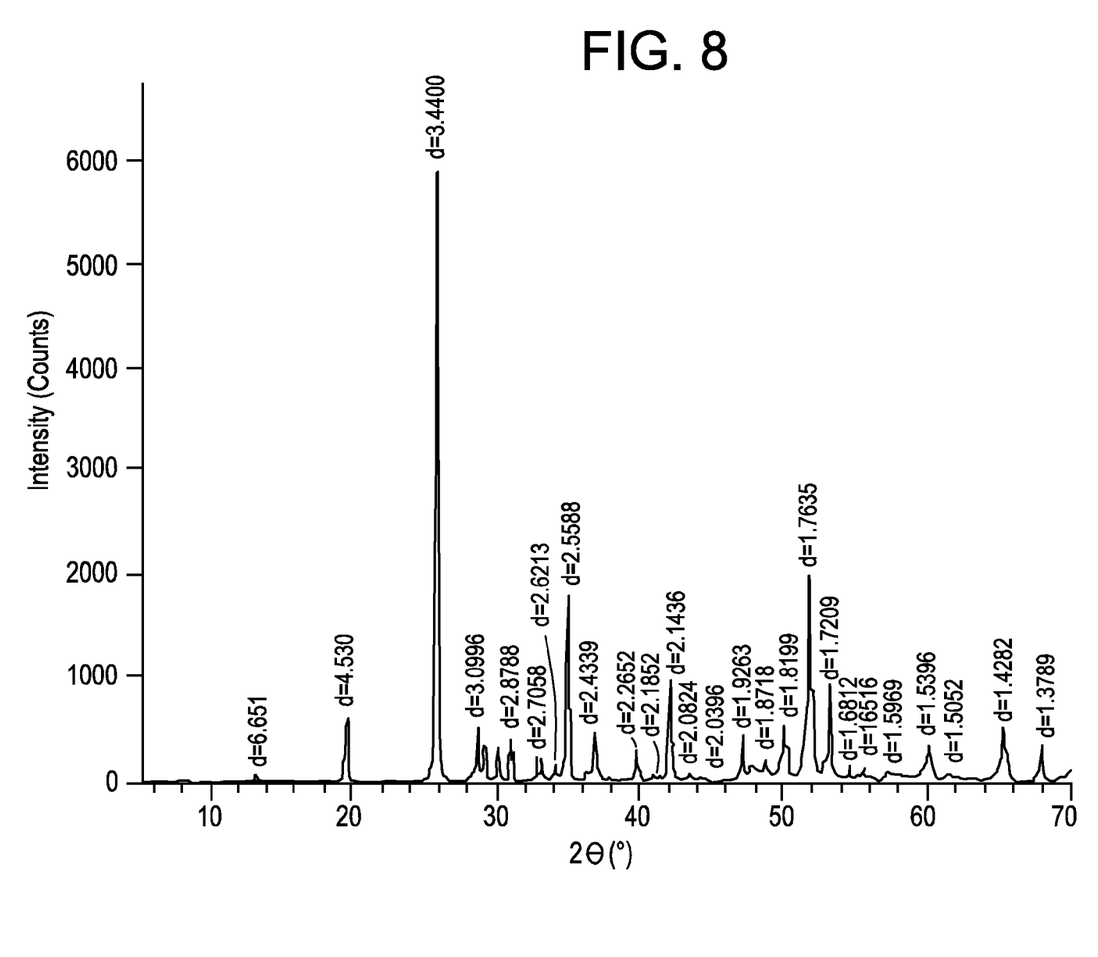
FIG. 8 is a SEM image of a ceramic material made according to one embodiment of the present invention.

XRD results of an iso-pressed rod (designated RC-01) made from the Blend-4 are shown in FIG. 8 following the final sintering step at 1750° C. for 5 days. The material is essentially phase-pure $YPO_4$ except for the very minor peaks at 28-31° 2θ noted in FIG. 7 from the unidentified phase(s). The XRD scan of the isopressed stoichiometric blend was similar to that shown in FIG. 7 for the mid-yttria blend, Blend-4, although the peak height of the unknown phase(s) was lower.

Figure 9:
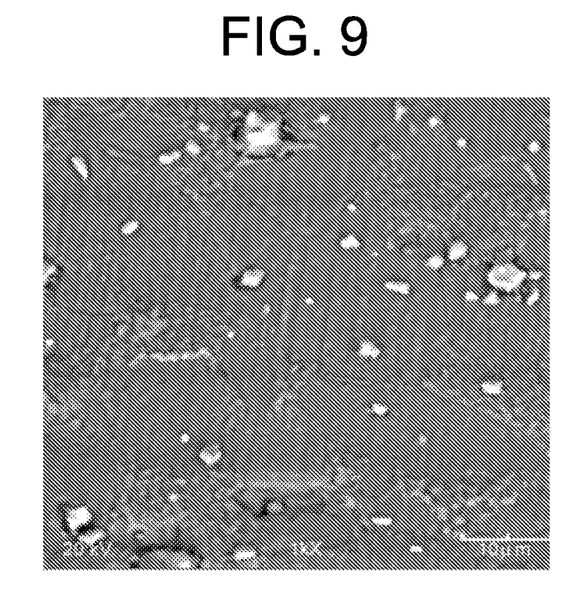
FIG. 9 shows a SEM micrograph of a polished cross-section of a YPO4 rod made according to one embodiment of the present invention.

FIG. 9 shows a SEM micrograph of a polished interior section of the RC-01 (Blend-4) rod. Dense, interlocking crystalline structure with little evidence of residual glass or second phases is observed. The white particles shown in the picture are zirconia particles used to polish the sample for SEM. The coarse crystal size (approximately 10-25 μm) is particularly attractive for a very low creep behavior at high temperatures. The dense appearance seen in the micrograph was confirmed by measured porosity measurements on the sample, which, by the Archimedes technique, was 3.8%.

After firing, the iso-pressed rod of RC-01 was sectioned into 6" test bars for high temperature mechanical evaluation. This evaluation took the form of: 1) sag measurements on flexure bars that were re-heated to 1250° under a 1000 psi load for 100 hours; and 2) flexural creep measurements performed at 1250° and 1000 psi load.

Listed in TABLE IV is a compilation of the sag, creep, and XRD results for the several iso-pressed $YPO_4$ rods made by the reactive-ceramming process. Also shown are representative data for $YPO_4$ samples made by the solid state process and wet processes. In the solid-state process, dry powders of $P_2O_5$ and $Y_2O_3$ were mixed and fired directly to obtain a ceramic of the final, stoichiometric composition. In the wet process, $Y_2O_3$ was mixed with $H_3PO_4$ and then fired directly to obtain a ceramic of the final, stoichiometric composition. Sag results indicated that the deflection of the bars made from Blend-4 and Blend-1 was comparable to the best solid state process batches. The steady state creep rate was also comparable between the two approaches: $1.4 \times 10^{-7}$/hr for the rod made from Blend-4 relative to $1.0$-$2.0 \times 10^{-7}$/hr for the solid state process. The flexural creep rate of the rod made from the stoichiometric Blend-1 was not measured due to a sample damage. However, it is quite likely, given the low sag deflection, that the creep rate of the rod made from Blend-1 would be towards the lower end of that range of that measured for the dry process, i.e., approximately $1.0 \times 10^{-7}$/hr.

Therefore, reactive-ceramming can be used for obtaining sintered, high-density $YPO_4$ articles with high temperature deformation resistance at least comparable to the solid state $YPO_4$ process, but with the possibility of substantial process simplification.

TABLE IV

| | Reactive-ceramming blends | | | Solid state process | Wet process |
|---|---|---|---|---|---|
| | Blend-3 | Blend-4 (RC-01) | Blend-1 | | |
| Sag deflection | N/D | 0.013 | 0.006-0.008 | 0.003-0.010 | 0.348 |
| Creep rate ($\times 10^{-7}$ hr$^{-1}$) | N/D | $1.4 \times 10^{-7}$ | N/D | 1.0-2.0 | N/D |

The sample of Blend-3 survived 1580°, but melted during 1750° firing.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A process for making a substantially crystalline material having a chemical composition consisting essentially of $Y_2O_3.(P_2O_5)_x$, where x is the molar ratio of $P_2O_5$ to $Y_2O_3$ in the composition of the crystalline material, and $0.30 \leq x \leq 1.20$, the process comprising the following steps:
   (I) providing a YP-glass having a composition consisting essentially of $Y_2O_3.(P_2O_5)_y$ and a softening temperature of Tsoft, where y is the molar ratio of $P_2O_5$ to $Y_2O_3$ in the YP-glass, and $1.6 \leq y \leq 9.0$;
   (II) providing a Y-source material;
   (III) obtaining a mixture upon melting having a molar ratio of $P_2O_5$ to $Y_2O_3$ equal to x and comprising a plurality of particles of the YP-glass and a plurality of particles of the Y-source material; and
   (IV) heating the mixture resulting from step (III) to a temperature T1 higher than Tsoft, whereby a first ceramic is obtained.

2. A process according to claim 1, wherein in step (III), the mixture is obtained in such a way that $0.95 \leq x \leq 1.00$.

3. A process according to claim 2, wherein in step (V), the particle size distribution of the first ceramic has a median particle size from 5 μm to 30 μm.

4. A process according to claim 1, wherein in step (III), the mixture is obtained in such a way that $1.00 \leq x \leq 1.05$.

5. A process according to claim 1, wherein the substantially crystalline material has a substantially homogeneous chemical composition.

6. A process according to claim 1, wherein T1 is at least 1000° C.

7. A process according to claim 1, further comprising:
   (V) forming a plurality of particles of the first ceramic obtained from step (IV); (VI) forming a compressed green body from ttle particles of the first ceramic; and (VII) heating the compressed green body to a temperature T2 higher than 1400° C. to obtain a dense bulk ceramic material.

8. A process according to claim 1, wherein step (I) comprises any one of (I1), (I2) and (I3):
(I1) forming a molten glass from Y2O3 powder and P2O5 powder;
(I2) forming a molten glass from Y2O3 powder and H3PO4 liquid; and
(I3) forming a molten glass from a Y2O3-source material and a P2O5-source material.

9. A process according claim 1, wherein the substantially crystalline material consists essentially of phase-pure YPO4.

10. A process according to claim 1, wherein in step (III), the particle size distribution of the particles of the YP-glass has a median particle size from 5 μm to 30 μm.

11. A process according to claim 1, wherein in step (III), the particle size distribution of the particles of the Y-source material has a median particle size from 5 μm to 30 μm.

12. A process according to claim 1, wherein in step (III), the mixture comprises, in addition to the particles of the YP-glass, at least one of the following:
(III-M-1) particles of Y2O3;
(III-M-2) particles of a second Y-source material having a composition represented by the formula having a composition consisting essentially of $Y_2O_3"(P_2O_5)_z$, where z is the molar ratio of P2O5 to Y2O3 in the YP-glass, and z 1; and
(III-M-3) particles of a third Y-source material that in step (IV) can be transferred into Y2O3.

13. A process according to claim 1, wherein the substantially crystalline material obtained has a porosity lower than 8% by volume.

14. A process according to claim 1, wherein at least 80% of the pores in the substantially crystalline material are closed pores.

15. A process according claim 1, wherein the substantially crystalline material has a creep rate at 1250° C. and 1000 psi of at most $5.0*10^{-7}$ $K^{-1}$.

* * * * *